United States Patent [19]

Azuma

[11] Patent Number: 5,434,718
[45] Date of Patent: Jul. 18, 1995

[54] AUTOMATIC GAIN CONTROLLING CIRCUIT FOR RECORDING AND REPRODUCING UNIT ASSOCIATED WITH MAGNETIC HEAD AND FREE FROM RELATIVE ACCURACY BETWEEN CIRCUIT COMPONENTS

[75] Inventor: Kunihiko Azuma, Tokyo, Japan

[73] Assignee: NEC Corporation, Tokyo, Japan

[21] Appl. No.: 253,123

[22] Filed: Jun. 2, 1994

[30] Foreign Application Priority Data

Jun. 2, 1993 [JP] Japan ................... 5-131546

[51] Int. Cl.$^6$ .................. G11B 5/09; G11B 5/035; G11B 5/02
[52] U.S. Cl. ...................... 360/46; 360/65; 360/68
[58] Field of Search ............ 360/46, 65, 67, 68; 358/310, 315, 316, 318; 330/278

[56] References Cited

U.S. PATENT DOCUMENTS

| | | | |
|---|---|---|---|
| 5,101,310 | 3/1992 | Brown | 360/68 |
| 5,206,738 | 4/1993 | Nishigaki et al. | 360/68 |

FOREIGN PATENT DOCUMENTS 0481824 4/1992 European Pat. Off. .
61-29405 2/1986 Japan .

OTHER PUBLICATIONS

Patent Abstracts of Japan, vol. 14, No. 168(E-0912) Mar. 30, 1990.
Patent Abstracts of Japan, vol. 15, No. 108 (E-1045) Mar. 14, 1991.
Patent Abstracts of Japan, vol. 16, No. 379 (E-1247) Aug. 13, 1992.
Patent Abstracts of Japan, vol. 6, No. 166 (P-138) (1044) Aug. 31, 1982.

*Primary Examiner*—Andrew L. Sniezek
*Assistant Examiner*—Won Tae C. Kim
*Attorney, Agent, or Firm*—Foley & Lardner

[57] ABSTRACT

An automatic gain controlling circuit is associated with magnetic heads for recording and reproducing pieces of video data information on a magnetic tape, and an in-phase current component is eliminated from a recording current flowing into one of the magnetic heads through a differential amplification between two input voltage levels produced from the recording current with the in-phase current component so that a gain control voltage signal is free from a relative accuracy between circuit components causative of the in-phase current component.

8 Claims, 4 Drawing Sheets

FROM VOLTAGE-TO-CURRENT CONVERTER

AUTOMATIC GAIN CONTROLLING CIRCUIT FOR RECORDING AND REPRODUCING UNIT ASSOCIATED WITH MAGNETIC HEAD AND FREE FROM RELATIVE ACCURACY BETWEEN CIRCUIT COMPONENTS

FIELD OF THE INVENTION

This invention relates to a semiconductor integrated circuit and, more particularly, to an automatic gain controlling circuit for a recording and reproducing unit associated with a magnetic head.

DESCRIPTION OF THE RELATED ART

The automatic gain controlling circuit is incorporated in a recording and reproducing unit for a video tape recording system, and a typical example of the automatic gain controlling circuit is illustrated in FIG. 1. The prior art automatic gain controlling circuit is formed from a semiconductor integrated circuit device 1 and discrete circuit components, i.e., resistors R1, R2 and R3, condensers C1, C2, C3, C4, C5 and C6 and first and second heads L1 and L2, and a horizontal synchronous signal HS1, a shift signal SH1 for a magnetic head and a shift signal SH2 between a recording mode and a reproducing mode are supplied to a controller 1a incorporated in the semiconductor integrated circuit device 1 for starting and controlling the recording/reproducing operations.

First, description is made on the circuit arrangement available for the recording operation. In the recording mode, the controller 1a is responsive to the shift signal SH2 so as to enable voltage-controlled amplifiers 1b and 1c, an adder 1d for calculating the sum of the outputs of the voltage-controlled amplifiers 1b and 1c and a current amplifier 1e. The controller 1a makes a first switching element SW1 open, and allows a second switching element SW2 and a third switching element SW3 to enter into conductive state. At least the second and third switching elements SW2 and SW3 are implemented by switching transistors, respectively.

The first voltage-controlled amplifier 1b amplifies a low-band converted color signal CL1 supplied to a terminal TR1 with a gain corresponding to a controlling voltage applied to a terminal TR2. Similarly, the voltage-controlled amplifier 1c amplifies a frequency-modulated luminance signal LM1 supplied to a terminal TR3. The adder 3 adds the output of the voltage-controlled amplifier 1b to the output of the voltage-controlled amplifier 1c, and the output signal indicative of the sum is transferred to a terminal TR4.

A voltage-to-current convertor 1f is implemented by a series of the condenser C1 and the resistor R1, and is coupled in between the terminal TR4 and a terminal TR5. The input impedance at the terminal TR5 is much smaller than the impedance of the voltage-to-current converter 1f, and the amount of current flowing into the input node IN3 is approximately equal to the quotient of the dividing the voltage level at the output node OUT1 by the impedance of the voltage-to-current converter 1f.

The current amplifier 1e amplifies the current supplied from the input node IN3, and the increased current is supplied to a terminal TR6. The increased current is called as a recording current. The first switching element has been already made open, and the recording current does not flow to the condenser C2. The recording current flows through the first head L1 and the second head L2 into the damping resistor R2. The damping resistor R2 restricts resonance due to the inductances of the first and second heads L1 and L2, the output capacitance of the current amplifier 1e and a parasitic capacitance. The first branch-current flows through the head L1 into a terminal TR7, and reaches a resistor R4. The controller 1a has already closed the switching element SW2, and, for this reason, the first branch current is discharged through a terminal TR8 to the ground. The second branch current flows through the head L2 into a terminal TR9, and passes through a resistor R5, the switching element SW3 and the terminal TR9. Thus, the second branch current is also discharged to the ground. The resistor R4 is approximately equal in resistance to the resistor R5.

While passing through the resistors R4 and R5, the first branch current produces a potential difference between nodes N1 and N2 proportional to the amount thereof, and the second branch current also produces a potential difference between nodes N3 and N4 proportional to the amount thereof. The potential differences are detected by recording-current detecting circuits 1g and 1h, and the output signals S1 and S2 indicative of the potential differences are supplied from the recording-current detecting circuits 1g and 1h to a detector 1i.

The terminals TR7 and TR9 are respectively coupled through the condensers C3 and C4 with terminals TR10 and TR11 which in tern are respectively coupled with reproducing amplifiers 1j and 1k. However, the reproducing amplifiers 1j and 1k are $10^3$ times larger in resistance than the resistor R4 and R5, and current flowing into the TR10 and TR11 are ignoreable.

A control voltage CV1 is supplied to a terminal TR12, and a voltage-to-current converter 1m converts the control voltage CV1 to a control current CC1 with the assistance of the reference resistor R3 coupled between a terminal TR13 and the ground. The controller 1a transfers the horizontal synchronous signal HS1 and the shift signal SH1 as an internal horizontal synchronous signal S3 and an internal shift signal S4. The detector 1i is responsive to the control current CC1, the internal horizontal synchronous signal S3 and the shift signal S4 for selectively detecting the output signals S1 and S2. Namely, the detector 1i compares a set level determined by the control current with a detected voltage level in a horizontal synchronous period.

If the detector 1i selects the output signal S1, the detector 1i charges or discharges the hold condenser C5 coupled through a terminal TR14, and the internal shift signal S4 causes a selector 1n to transfer a voltage level at a node N5 to the voltage-controlled amplifier 1c. On the other hand, if the other output signal S2 is selected, the detector 1i charges and discharges the other hold condenser C6 through a terminal TR15, and the selector 1n transfers a voltage level at a node N6 to the voltage-controlled amplifier 1c. The voltage level at either N5 or N6 serves as the control voltage for the voltage-controlled amplifier 1c.

Assuming now that the shift signal SH2 is indicative of the recording mode, the current amplifier 1e supplies the current proportional to the total amount of currents converted from the color signal CL1 and the luminance signal LM1, and the current is branched to the branch currents respectively supplied to the heads L1 and L2. The resistors R4 and R5 convert the branch currents to the potential differences, and the potential differences are proportional to the amplitudes of the branch currents, respectively.

As described hereinbefore, the second and third switching elements SW2 and SW3 are implemented by the respective switching transistors, and in-phase components are superimposed on the branch currents. The in-phase components are proportional to the amplitudes of the branch currents. For this reason, the recording current detecting circuits 1g and 1h are implemented by differential amplifiers so as to detect the potential differences exactly proportional to the branch currents flowing through the heads L1 and L2 after elimination of the in-phase components.

The detector 1i detects the amplitude of the frequency-modulated luminance signal component contained in the recording current, and compares it with the set level supplied from the voltage-to-current converter 1m in the horizontal synchronous period. The detector 1i charges and discharges the hold condenser C5 or C6 through the terminal TR14 or TR15 depending upon the comparison result. If the amplitude of the frequency-modulated luminance signal component in the recording current is larger than the set level determined by using the controlling current CC1 supplied from the voltage-to-current converter 1m, the voltage level at the node N5 or N6 decreases the gain of the voltage-controlled amplifier 1c. On the other hand, if the amplitude of the frequency-modulated luminance signal component is smaller than the set level, the voltage level at the node N5 or N6 increases the gain of the voltage-controlled amplifier 1c. This results in that the amplitude of the luminance signal component is converged to the set level by controlling the gain of the voltage-controlled amplifier 1c.

If the detector 1i selects the output signal S1 and, accordingly, the branch current passing through the head L1, the detector 1i charges and discharges the hold condenser C5 through the terminal TR14, and the selector 1n transfers the voltage level at the node N5 to the voltage-controlled amplifier 1c. As a result, a feedback loop is formed for the frequency-modulated luminance signal the head L1. However, current does not flow through the terminal TR15, and the voltage level at the hold condenser C6 is maintained.

On the other hand, if the detector 1i selects the branch current flowing through the head L2, the hold condenser C6 is charged and discharged through the terminal TR15, and the voltage level at the node N6 is transferred through the selector 1n to the voltage-controlled amplifier 1c. As a result, the feedback loop is formed for the frequency-modulated luminance signal component in the branch current passing through the head L2, and the hold condenser C5 is not charged and discharged.

The shift signal SH1 periodically changes the indication between the branch currents, and the detector 1i alternates the target signal between S1 and S2 under the control of the controller 1a. In other words, the detector 1i is shared between the heads L1 and L2 in a time sharing fashion.

Subsequently, description is made on the circuit arrangement used in the resproducing mode. In the reproducing mode, the controller 1a is responsive to the shift signal SH2 indicative of the reproducing mode, and disables the voltage-controlled amplifiers 1b and 1c, the adder 1d and the current amplifier 1e. On the other hand, the controller 1a enables the reproducing amplifiers 1j and 1k, and makes the first switching element SW1 close. However, the second and third switching elements SW2 and SW3 are opened. As a result, the first switching element SW1 is grounded through the terminal TR8, and is connected through the condenser C2 with a node N7 shared between the terminal TR6, the damping resistor R2 and the heads L1 and L2.

The head L1 is further connected through the condenser C3 with the terminal TR10, and the head L2 is also connected through the condenser C4 with the terminal TR11. The terminals TR10 and TR11 in turn are connected with the respective input nodes of the reproducing amplifiers 1j and 1k. However, a circuit arrangement after the reproducing amplifiers 1j and 1k does not directly concern problems inherent in the prior art automatic gain controlling circuit, and no further description is incorporated hereinbefore.

The prior art automatic gain controlling circuit behaves in the reproducing mode as follows. The first switching element has been closed, and the condenser C2 is 0.1 micro-farad. For this reason, the impedance is extremely low, and the common node shared between the heads L1 and L2 is seemed to be short-circuited for an alternating current.

In the reproducing mode, the heads L1 and L2 produce reproducing signals indicative of recorded data information, and supply the reproducing signals to the terminals TR10 and TR7 and to the terminals TR9 and TR11. Although the current detecting resistors R4 and R5 are respectively coupled with the terminals TR7 and TR9, the second and third switching elements SW2 and SW3 are opened, and the impedances at the terminals TR7 and TR9 are extremely high. This means that the resistors R4 and R5 are ignoreable as loads coupled with the heads L1 and L2. The voltage signal produced by the head L1 is supplied through the condenser C3 and the terminal TR10 to the reproducing amplifier 1j, and the voltage signal produced by the head L2 is supplied through the condenser C4 and the terminal TR11 to the reproducing amplifier 1k. The condensers C3 and C4 serve as coupling condensers for the reproducing amplifiers 1j and 1k, and are approximately equal in capacitance to the condenser C2.

Turning to FIG. 2 of the drawings, the detector 1i comprises input nodes N8 and N9 respectively coupled with the detecting circuits 1g and 1h, a selector 1p responsive to the internal shift signal S4 for selecting one of the input nodes N8 and N9, a high pass filter 1q for extracting the frequency-modulated luminance signal component from the output signal S1 or S2, a full-wave rectifier 1r for producing a direct voltage signal proportional to the amplitude of the extracted luminance signal component, a low pass filter 1s and two comparators 1t and 1u for comparing the direct voltage signal with the set level produced by a resistor R6 on the basis of the control current CC1. The comparators 1t and 1u are selectively enabled with the internal shift signal S4, and the output voltage signal of the enabled comparator 1t or 1u is valid during the internal horizontal synchronous signal period.

If the internal shift signal S4 is indicative of the detecting circuit 1g, the output signal S1 is supplied through the selector 1p to the high pass filter 1q, and the luminance signal component is extracted from the output signal S1. The luminance signal component is converted into the direct voltage signal, and the comparator 1t compares the direct voltage signal with the set level. The output signal of the comparator 1t is valid in a horizontal synchronous period defined by the internal horizontal synchronous signal, and the comparator 1t supplies the valid voltage signal to the node S5.

On the other hand, if the internal shift signal S5 is indicative of the detecting circuit 1b, the output signal S2 is supplied through the selector 1p to the high pass filter 1q, and the luminance signal component is extracted from the output signal S2. The luminance signal component is converted into the direct voltage signal, and the comparator 1u compares the direct voltage signal with the set level. The output signal of the comparator 1u is valid in another horizontal synchronous period, and the comparator 1t supplies the voltage signal to the node S6.

The resistors R4, R5 and R6 are implemented by resistive strips formed through a fabrication process sequence, and the amplitude of the recording current is not seriously affected by a dispersion in resistance therebetween. However, the dispersion of the resistance can not be perfectly eliminated from the resistors, and the dispersion of the recording current is depending on a relative accuracy between the resistors. The relative accuracy is not less than 5 per cent.

While the prior art automatic gain controlling circuit is operating in the reproducing mode, the input nodes of the reproducing amplifiers 1j and 1k are coupled with the resistors R4 and R5 by the alternating currents, and the resistors R4 and R5 are as low as 10 ohms. For this reason, both ends of each resistor R4 or R5 are substantially short-circuited to the input node of the associated reproducing amplifier 1j or 1k in the reproducing mode. The reproducing amplifiers 1j and 1k are so large in gain and so weak in the input signal level that all the nodes equal in voltage level to the input nodes thereof should be short-circuited through wirings as short as possible in view of stability. This means that a designer should arrange the reproducing amplifiers 1j and 1k, the detecting circuits 1g and 1h and the resistors R4 and R5 around a peripheral area of the semiconductor chip assigned to pads.

On the other hand, in the recording mode, the magnitude of the recording current is determined by the relative ratio between the resistor R6 of the detector 1i and the resistor R4/R5, and the designer needs to arrange the resistor R6 as close to the resistors R4 and R5 as possible.

However, if the designer takes undesirable oscillation in the reproducing mode, the requirement in the recording mode is not feasible. Especially, if the recording/reproducing heads are increased to more than one pair, the designer needs to arrange the associated resistor pairs R4/R5 throughout the semiconductor chip. In this situation, even though the relative accuracy between the resistors is minimized to 5 per cent, it is impossible to restrict the dispersion of the recording current less than 5 per cent.

SUMMARY OF THE INVENTION

It is therefore an important object of the present invention to provide an automatic gain controlling circuit which is free from a relative accuracy between circuit components.

To accomplish the object, the present invention proposes to eliminate an in-phase current component from an output current of a current amplifier for a recording current by using a differential amplifier.

In accordance with the present invention, there is provided an automatic gain controlling circuit associated with a head means for recording pieces of data information on a magnetic recording medium, comprising: a) a recording current producing means responsive to a gain controlling voltage signal for producing a recording current from a color signal and a luminance signal, the recording signal being supplied to the head means; b) a first resistor means coupled between the head means and a constant voltage source, and allowing the recording current containing an in-phase current component to flow therethrough for producing a first voltage level and a second voltage level at both ends thereof; c) a second resistor means coupled with one of the both ends of the first resistor means for producing a first input current from the first voltage level; d) a third resistor means coupled with the other of the both ends of the first resistor means for producing a second input current from the second voltage level; e) a recording current amplifier means having a first input node coupled with the second resistor means and a second input node coupled with the third resistor means, and operative to amplify the first input current and the second input current for producing a first output current and a second output current; and f) a detector circuit having f-1) a current-to-voltage converting circuit for converting the first output current and the second output current into a first input voltage and a second input voltage, f-2) a differential amplifier operative to amplify a potential difference between the first input voltage and the second input voltage for producing an output signal indicative of the amount of the recording current without the in-phase current component, and f-3) a control voltage producing means responsive to the output signal for producing the gain control voltage signal.

BRIEF DESCRIPTION OF THE DRAWINGS

The feature and advantages of the automatic gain controlling circuit according to the present invention will be more clearly understood from the following description taken in conjunction with the accompanying drawings in which.

DESCRIPTION OF THE PREFERRED EMBODIMENT

Figure 1:
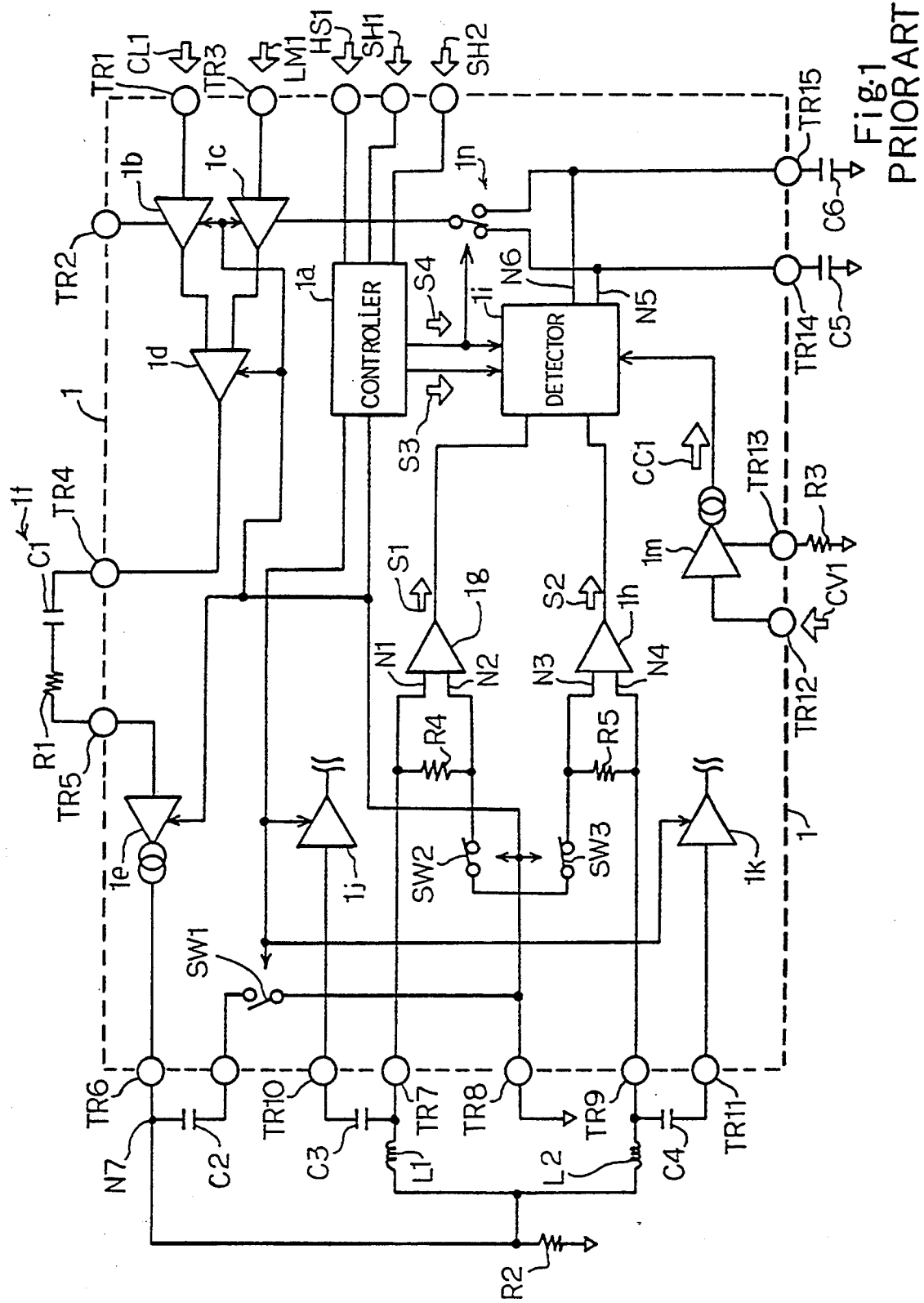
FIG. 1 is a circuit diagram showing the arrangement of the prior art automatic gain controlling circuit.
Figure 2:
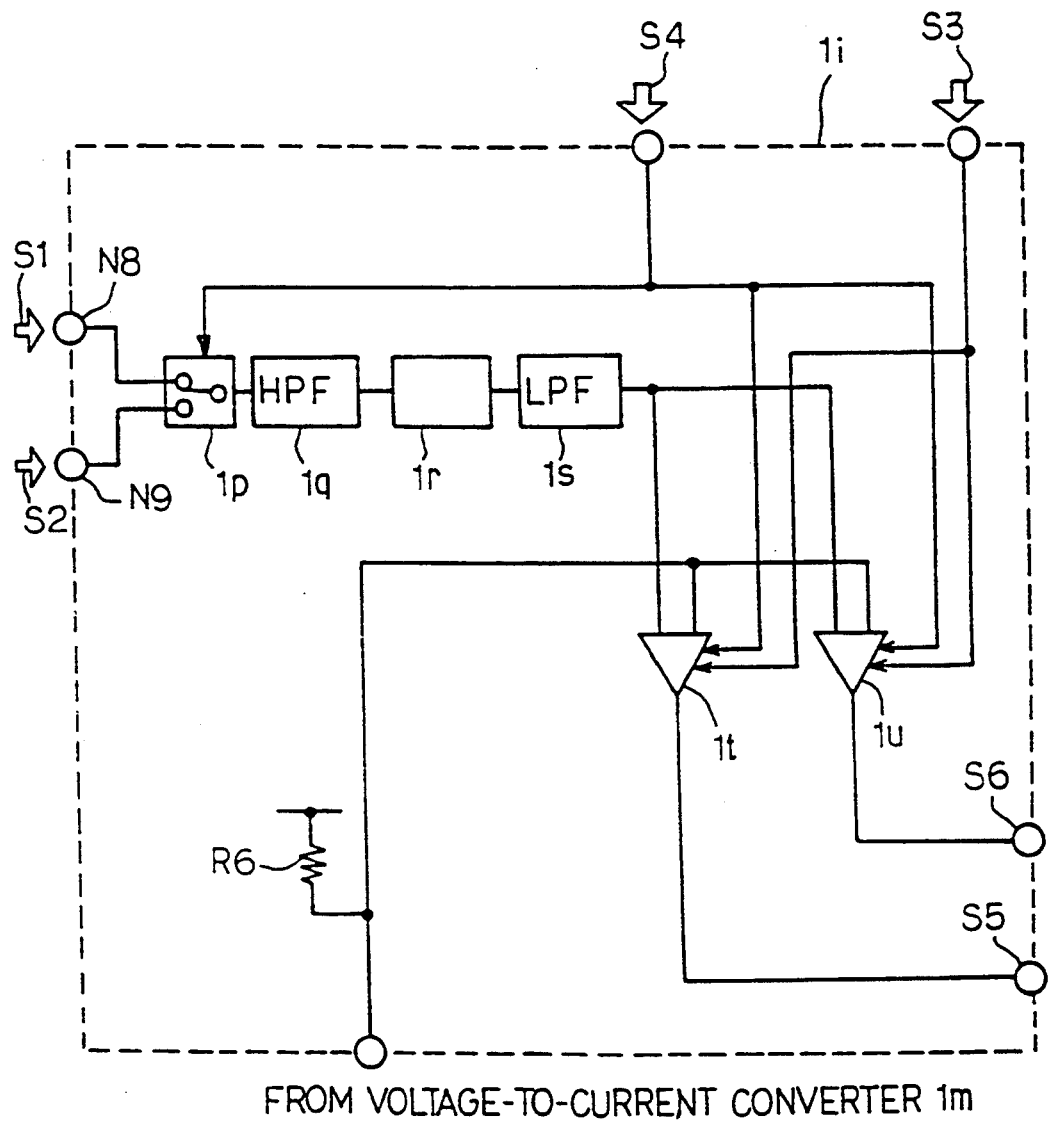
FIG. 2 is a circuit diagram showing the arrangement of the detector incorporated in the prior art automatic gain controlling circuit.
Figure 3:
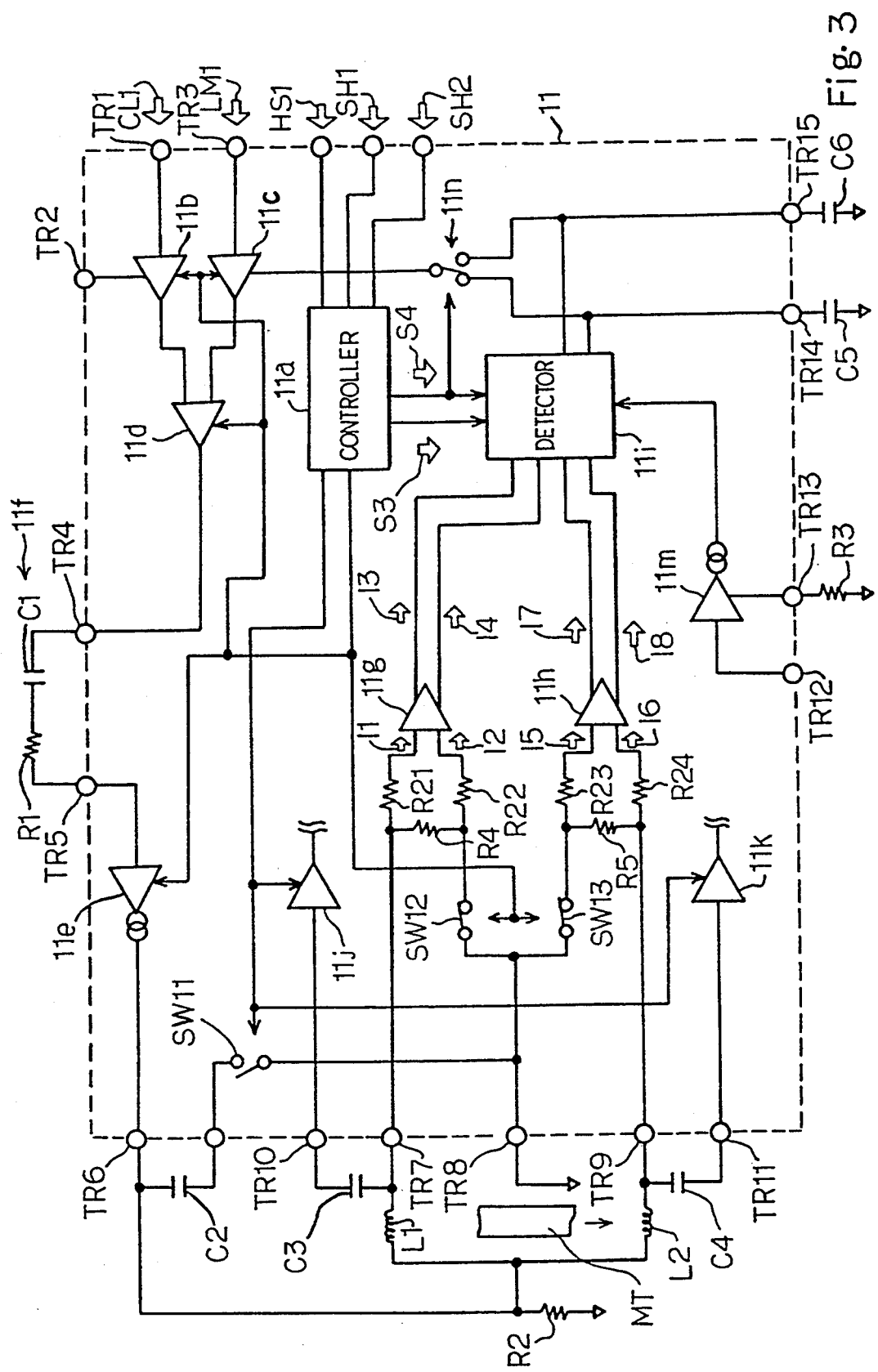
FIG. 3 is a circuit diagram showing the arrangement of an automatic gain controlling circuit according to the present invention.

Referring to FIG. 3 of the drawings, a recording and reproducing unit embodying the present invention is formed from a semiconductor integrated circuit device 11 and discrete circuit components, i.e., resistors R1, R2 and R3, condensers C1, C2, C3, C4, C5 and C6 and first and second heads L1 and L2 respectively implemented by inductors, and a horizontal synchronous signal HS1, a shift signal SH1 indicative of one of the magnetic heads L1 and L2 and a shift signal SH2 indicative of one of a recording mode and a reproducing mode are supplied to a controller 1a incorporated in the semiconductor integrated circuit device 1 for controlling the recording/reproducing operations. The discrete circuit components R1 and R2, C1 to C4 and L1 and L2 are similar to those of the prior art recording and reproducing unit. A first branch current and a second branch current respectively flow through the heads L1 and L2 in the recording mode. A magnetic tape MT is traveling in the vicinity of the heads L1 and L2 in both recording and reproducing modes.

The semiconductor integrated circuit device 11, and comprises a controller 11a, two voltage-controlled amplifiers 11b and 11c, an adder 11d, a current amplifier 11e, three switching elements SW11, SW12 and SW13, recording-current detecting circuits 11f and 11g, a detector 11i, reproducing amplifiers 11j and 11k, a voltage-to-current converter 11m and a selector 11n. The condenser C1 and the resistor R1 form in combination a voltage-to-current converter 11f. The components of the recording and reproducing unit according to the present invention are similar to those of the prior art recording and reproducing unit except for the recording-current detecting circuits 11g and 11h and the detector 11i, and resistors R21, R22, R23 and R24 are further incorporated in the recording and reproducing unit according to the present invention. Terminals are labeled with the same references as those of the prior art recording and reproducing unit.

The recording and reproducing unit according to the present invention is broken down into an automatic gain controlling circuit, a reproducing circuit, a controlling circuit shared between the automatic gain controlling circuit and the reproducing circuit and the heads L1 and L2 also shared between the automatic gain controlling circuit and the reproducing circuit. The condenser C2, C3 and C4 and the reproducing amplifiers 11j and 11k as a whole constitute the reproducing circuit, and the controller 11a and the switching elements SW1 to SW3 form the controlling circuit. The other components 11b, 11c, 11d, 11e, 11f, 11g, 11h, 11i, 11m, 11n, the resistors R3 to R5 and R21 to R24 and the condensers C5 ad C6 as a whole constitute the automatic gain controlling circuit.

The voltage-controlled amplifiers 11b and 11c, the adder 11d and the voltage-to-current converter 11f as a whole serve as a recording signal producing means for supplying a recording current to the head L1 and L2, and the recording current amplifiers 11g and 11h form in combination a recording current producing means. The resistors R4 and R5, the resistors R21 and R23 and the resistors R22 and R24 serve as a first resistor means, a second resistor means and a third resistor means, respectively.

The different components are arranged as follows. As to the head L1, the newly added resistor R21 is connected between one end of the resistor R4 and an input node of the recording current detecting circuit 11g, and the newly added resistor R22 is inserted between the other end of the resistor R4 and another input node of the recording current detecting circuit 11g. The resistors R4, R21 and R22 are close to one another on a semiconductor chip where the semiconductor integrated circuit device is fabricated.

Input currents I1 and I2 are supplied to the input nodes of the recording current detecting circuit 11g, and the recording current detecting circuit 11g supplies output currents I3 and I4 to the detector 11i.

Similarly, the newly added resistors R23 and R24 are connected between both ends of the resistor R5 and input nodes of the recording current detecting circuit 11h, and the resistors R5, R23 and R24 are arranged to be close to one another. Input currents I5 ad I6 are supplied to the recording current detecting circuit 11h, and the recording current detecting circuit 11h supplies output currents I7 and I8 to the detector 11i.

Figure 4:
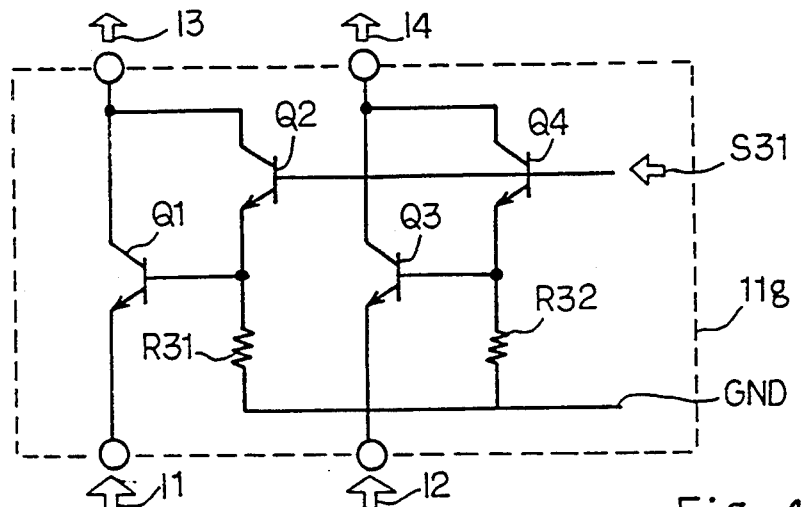
FIG. 4 is a circuit diagram showing the arrangement of a recording current detecting circuit incorporated in the automatic gain controlling circuit according to the present invention.

The recording current detecting circuit 11g is similar in circuit arrangement to the other recording current detecting circuit 11h, and the recording current detecting circuit 11g is illustrated in detail in FIG. 4. The recording current detecting circuit 11g/11h comprises bipolar transistors Q1 and Q2 forming a Darlington pair, bipolar transistors Q3 and Q4 also forming another Darlington pair and resistors R31 and R32, and is implemented by a common-base type amplifier. The ground voltage level biases the base nodes of the bipolar transistors Q1 and Q3 through the resistors R31 and R32, and an appropriate bias voltage S31 is supplied to the base nodes of the bipolar transistors Q2 and Q4. The recording current detecting circuit 11g thus arranged simply amplifies the input currents I1 and I2 for producing the output currents I3 and I4.

Figure 5:
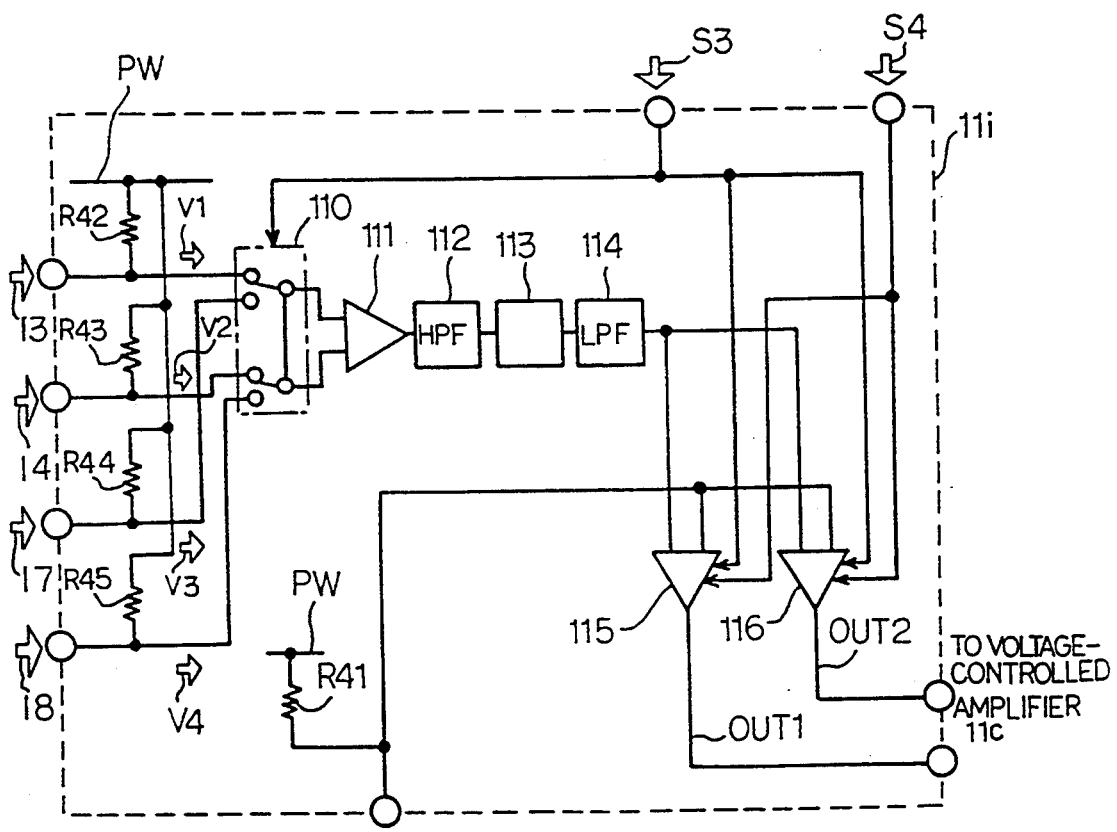
FIG. 5 is a circuit diagram showing the arrangement of a detector incorporated in the automatic gain controlling circuit according to the present invention.

Turning to FIG. 5 of the drawings, the detector comprises a selector 110, a differential amplifier 111, a high pass filter 112, a full-wave rectifier 113, a low pass filter 114, two comparators 115 and 116, a resistor R41 for producing a reference voltage level from the control current supplied from the voltage-to-current converter 11m and resistors R42, R43, R44 and R45 coupled between a power voltage line PW and the input nodes assigned to the output currents I3, I4, I7 and I8. The resistors R42 to R45 are approximately equal in resistance to one another, and convert the output currents I3, I4, I7 and I8 to input voltages V1, V2, V3 and V4. The resistors R41 to R45 and R16 are implemented by conductive strips simultaneously patterned in a fabrication process sequence, and are arranged to be close to one another. The relative accuracy in resistance is of the order of 1% between the resistors R41 to R45.

The high pass filter 112, the full-wave rectifier 113, the low pass filter 114, the comparators 115 and 116 and the resistor R41 are similar to the high pass filter 1q, the full-wave rectifier 1r, the low pass filter 1s, the comparators 1t and 1u and the resistor R6, respectively, and no further description is made on these components.

The selector 110 is responsive to the internal shift signal S3 for transferring the input voltage levels V1/V2 or V3/V4 to the differential amplifier 111, and the differential amplifier 111 eliminates in-phase components from the output currents I3/I4 or I7/I8. After the elimination of the in-phase components, the output signal of the differential amplifier 111 is treated as similar to the prior art.

The newly added components behave as follows. The resistors R21 and R22 are equal in resistance to each other, and are larger in resistance than the resistor R4. The input impedances of the recording current detecting circuit 11g are equal to each other, and are smaller than the resistors R21 and R22. The input currents I1 and I2 are calculated by dividing the voltage levels at both ends of the resistor R4 by the resistances of the resistors R21 and R22, and the current amplifier 11g amplifies the input currents I1 and I2 for producing the output currents I3 and I4.

The resistor R5 is equal in resistance to the resistor R4, and the resistors R23 and R24 are equal in resistance to the resistors R21 and R22, respectively. For this reason, the input currents I5 and I6 are calculated by dividing the voltage level at both ends of the resistor R5 by the resistances of the resistors R23 and R24, respectively, and the current amplifier 11g amplifies the input currents I5 and I6 for producing the output currents I7 and I8.

The detector 11i behaves as follows. The output current I3 is proportional to the first branch current containing an in-phase current component, and the output current I4 is proportional to the in-phase current component. The output current I7 is proportional to the second branch current containing an in-phase current component, and the output current I8 is proportional to the in-phase current component. These output currents I3/I4 and I7/I8 are supplied from the current amplifiers 11g and 11h to the selector 110, and the resistors R42 to R45 respectively convert the output currents I3, I4, I7 and I8 to the input voltage levels V1, V2, V3 and V4. As described hereinbefore, the relative accuracy is about 1% between the resistors R41 to R45, and a new in-phase component is hardly introduced into the input voltage levels V1 to V4. The selector 110 selectively transfers the input voltage levels V1/V2 and V3/V4, and the differential amplifier 111 increases the potential difference between the input voltage level V1 and the input voltage level V2. This means that the in-phase current component is eliminated from the first or second branch current, and the output signal of the differential amplifier 111 is indicative of the recording current component without in-phase current component. As a result, the comparator 115 or 116 can produce the control voltage exactly representing the ratio between the amplitude of the true recording current component and the control current at the output node OUT1/OUT2 thereof.

As will be appreciated from the foregoing description, the differential amplifier 111 eliminates the in-phase current component from the recording current, and the comparator 115 or 116 exactly controls the voltage-controlled amplifier 11c regardless of the relative accuracy between the circuit components fabricated on a semiconductor chip.

Although particular embodiments of the present invention have been shown and described, it will be obvious to those skilled in the art that various changes and modifications may be made without departing from the spirit and scope of the present invention. For example, the semiconductor integrated circuit device may form a part of a large scale integration, and some discrete devices may be incorporated in the semiconductor integrated circuit device.

What is claimed is:

1. An automatic gain controlling circuit associated with a head means for recording pieces of data information on a magnetic recording medium, comprising:
    a) a recording current producing means responsive to a gain controlling voltage signal for producing a recording current from a color signal and a luminance signal, said recording current being supplied to said head means;
    b) a first resistor means coupled between said head means and a constant voltage source, and allowing said recording current containing an in-phase current component to flow therethrough for producing a first voltage level and a second voltage level at both ends thereof;
    c) a second resistor means coupled with one of said both ends of said first resistor means for producing a first input current from said first voltage level;
    d) a third resistor means coupled with the other of said both ends of said first resistor means for producing a second input current from said second voltage level;
    e) a recording current amplifier means having a first input node coupled with said second resistor means and a second input node coupled with said third resistor means, and operative to amplify said first input current and said second input current for producing a first output current and a second output current; and
    f) a detector circuit having
        f-1) a current-to-voltage converting circuit for converting said first output current and said second output current into a first input voltage and a second input voltage,
        f-2) a differential amplifier operative to amplify a potential difference between said first input voltage and said second input voltage for producing an output signal indicative of the amount of said recording current without said in-phase current component, and
        f-3) a control voltage producing means responsive to said output signal for producing said gain control voltage signal.

2. The automatic gain controlling circuit as set forth in claim 1, in which said recording current producing means comprises
    a first voltage-controlled amplifier responsive to an external gain controlling signal for amplifying said color signal,
    a second voltage-controlled amplifier responsive to said gain controlling voltage signal for amplifying said luminance signal,
    an adder having a first input node coupled with the output node of said first voltage-controlled amplifier and a second input node coupled with the output node of said second voltage-controlled amplifier for producing an output voltage signal indicative of the total sum of the output signals of said first and second voltage-controlled amplifiers,
    a voltage-to-current converter operative to convert said output voltage signal of said adder into an output current signal, and
    a current amplifier operative to produce said recording current from said output current signal.

3. The automatic gain controlling circuit as set forth in claim 1, in which said head means has a first head and a second head, said recording current being branched into a first branch current flowing into said first head and a second branch current flowing into said second head.

4. The automatic gain controlling circuit as set forth in claim 3, in which said first resistor means, said second resistor means, said third resistor means and said recording current amplifier means have first and second resistor elements coupled between said first head and said constant voltage source and said second head and said constant voltage source, third and fourth resistor elements for respectively producing first and second input sub-currents of said first input current from said first and second branch currents, fifth and sixth resistor elements for respectively producing third and fourth input sub-currents of said second input current from said first and second branch currents, and first and second current amplifiers for producing first and second output sub-currents of said first output current and third and fourth output sub-currents of said second output current.

5. The automatic gain controlling circuit as set forth in claim 4, in which each of said first and second current amplifiers comprises first and second bipolar transistors serving as a Darlington pair operative to amplify said first or second input sub-current for producing said first or second output sub-current, and a third and fourth bipolar transistors serving as another Darlington pair operative to amplify said third or fourth input sub-current for producing said third or fourth output sub-current.

6. The automatic gain controlling circuit as set forth in claim 4, in which said current-to-voltage converting circuit is implemented by seventh, eighth, ninth, tenth and eleventh resistor elements coupled in parallel between another constant voltage source and first, second, third and fourth input nodes of said detector circuit, said first, second, third and fourth output sub-currents being supplied to said first, second, third and fourth input nodes of said detector for producing first and second input sub-voltages of said first input voltage and third and fourth input sub-voltages of said second input voltage, said detector circuit further comprising a selector responsive to a shift signal indicative of one of said first and second heads for transferring said first and third input sub-voltages or said second and fourth input sub-voltages to said differential amplifier, said differential amplifier producing said output signal thereof from said first and third input sub-voltages or said second and fourth input sub-voltages.

7. The automatic gain controlling circuit as set forth in claim 6, in which said detector circuit further comprises a high-pass filter coupled with the output node of said differential amplifier, a full-wave rectifier coupled with the output node of said high-pass filter, a low-pass filter coupled with the output node of said full-wave rectifier, and first and second comparators selectively enabled with said shift signal and operative to compare an output signal of said low-pass filter with a reference voltage for producing said gain controlling voltage signal.

8. The automatic gain controlling circuit as set forth in claim 7, in which said reference voltage is produced by a fourth resistor means coupled between said another constant voltage source and said first and second comparators from a control current signal supplied from another voltage-to-current converter.

* * * * *